(12) United States Patent
Vuille et al.

(10) Patent No.: US 10,918,173 B2
(45) Date of Patent: Feb. 16, 2021

(54) ONE-PIECE BAR FOR ATTACHING A BRACELET TO A WATCH

(71) Applicant: The Swatch Group Research and Development Ltd, Marin (CH)

(72) Inventors: Pierry Vuille, Les Emibois (CH); Yoann Mosteiro Vazquez, Montmagny (CH)

(73) Assignee: The Swatch Group Research and Development Ltd, Mann (CH)

( * ) Notice: Subject to any disclaimer, the term of this patent is extended or adjusted under 35 U.S.C. 154(b) by 0 days.

(21) Appl. No.: 16/659,636

(22) Filed: Oct. 22, 2019

(65) Prior Publication Data

US 2020/0138152 A1  May 7, 2020

(30) Foreign Application Priority Data

Nov. 1, 2018  (EP) .................................. 18203985

(51) Int. Cl.
*A44C 5/14*  (2006.01)

(52) U.S. Cl.
CPC .............. *A44C 5/14* (2013.01); *Y10T 24/4718* (2015.01)

(58) Field of Classification Search
CPC ....... A44C 5/14; F16F 1/027; G04B 37/1493; Y10T 24/4718
See application file for complete search history.

(56) References Cited

U.S. PATENT DOCUMENTS

| | | | | |
|---|---|---|---|---|
| 1,628,501 A | * | 5/1927 | Lederer | A44B 11/24 24/265 R |
| 1,790,706 A | * | 2/1931 | Hill | G04B 37/1493 24/265 R |
| 2,171,185 A | * | 8/1939 | Maier | B21D 22/286 267/217 |
| 2,308,505 A | * | 1/1943 | Geoffrion | G04B 37/1486 24/265 R |
| 2,358,990 A | * | 9/1944 | Maxwell | G04B 37/1486 24/265 B |

(Continued)

FOREIGN PATENT DOCUMENTS

DE  766 618 C  8/1951
FR  2 323 350 A1  4/1977

(Continued)

OTHER PUBLICATIONS

European Search Report dated Apr. 1, 2019 in European Application 18203985.9 filed on Nov. 1, 2018 (with English Translation of Categories of Cited Documents).

(Continued)

*Primary Examiner* — Robert Sandy
*Assistant Examiner* — Rowland Do
(74) *Attorney, Agent, or Firm* — Oblon, McClelland, Maier & Neustadt, L.L.P.

(57) ABSTRACT

A one-piece bar is for attaching a bracelet to a watch. The bar extends in a longitudinal direction and includes two pivots and a body connecting the two pivots, each pivot being intended to be introduced into a corresponding housing of a respective horn of a watch case. The body includes a plurality of elements connected to one another, each element having a hollowed portion, in order to give the bar longitudinal elasticity and allow elastic deformation thereof in the longitudinal direction.

7 Claims, 1 Drawing Sheet

(56) References Cited

U.S. PATENT DOCUMENTS

| | | | | |
|---|---|---|---|---|
| 2,653,369 A * | 9/1953 | Rodriguez | ............... | A44C 5/14 |
| | | | | 24/265 B |
| 2,713,445 A * | 7/1955 | Speck | ...................... | A44C 5/14 |
| | | | | 24/265 WS |
| 3,217,374 A * | 11/1965 | Sang | ........................ | A44C 5/14 |
| | | | | 24/265 B |
| 5,557,587 A | 9/1996 | Tosaka et al. | | |
| 7,564,175 B2 * | 7/2009 | Stier | ................. | F02M 51/0603 |
| | | | | 310/26 |
| 7,841,320 B2 * | 11/2010 | D'Arrigo | ........... | F02M 51/0603 |
| | | | | 123/498 |
| 2003/0190185 A1 * | 10/2003 | Nussbaum | ......... | G04B 37/0472 |
| | | | | 403/154 |
| 2007/0243743 A1 | 10/2007 | Fujimoto | | |
| 2019/0222146 A1 * | 7/2019 | Mangeot | ............. | H01L 41/0536 |

FOREIGN PATENT DOCUMENTS

| | | |
|---|---|---|
| JP | S56-64311 U | 5/1981 |
| JP | H7-231802 A | 9/1995 |
| JP | 2004-329788 A | 11/2004 |
| JP | 2010-233744 A | 10/2010 |

OTHER PUBLICATIONS

Notice of the Reason for Refusal dated Nov. 4, 2020 in corresponding Japanese Patent Application No: 2019-194087 (with English translation)(5 pages)

\* cited by examiner

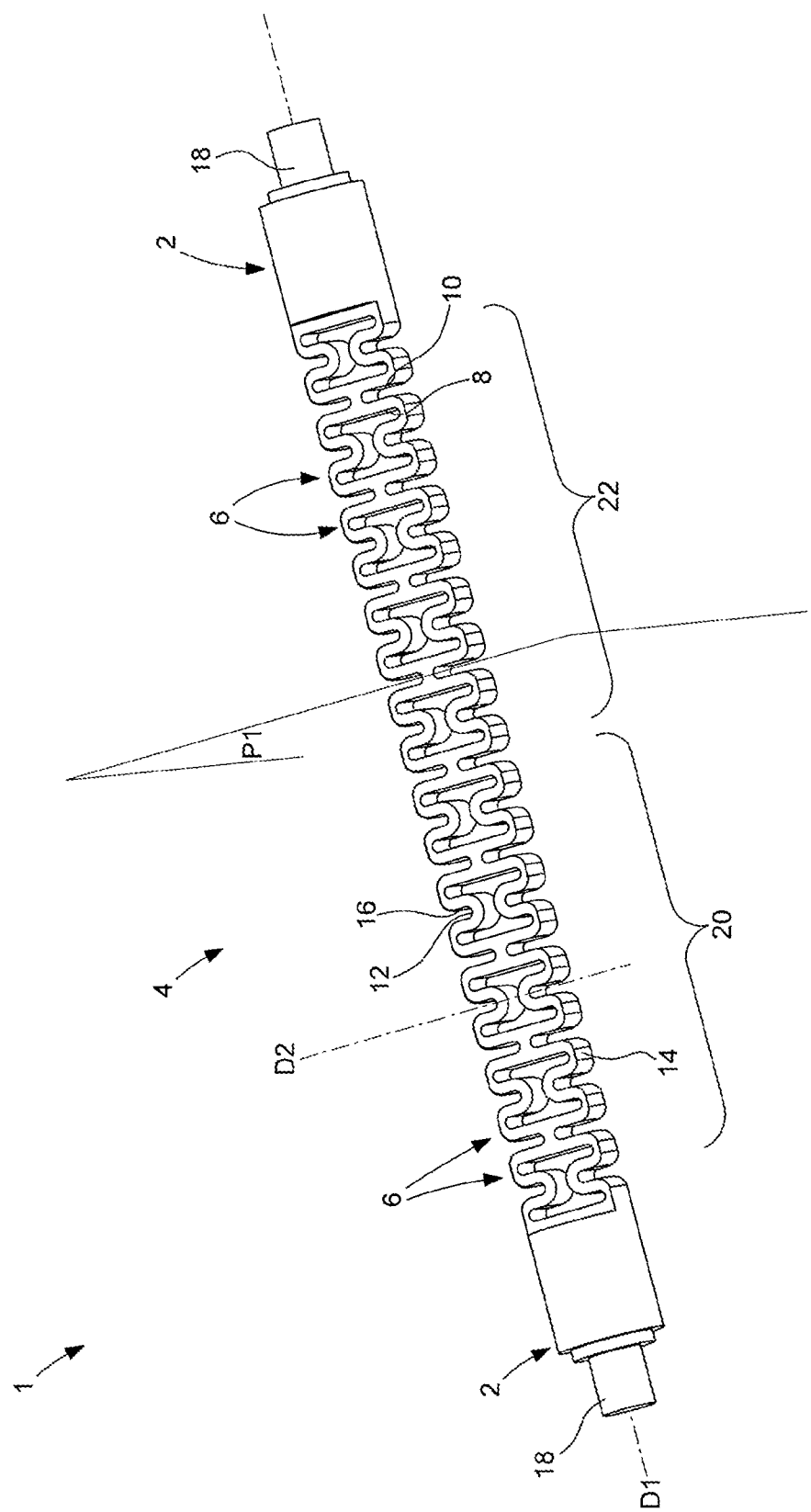

ONE-PIECE BAR FOR ATTACHING A BRACELET TO A WATCH

CROSS-REFERENCE TO RELATED APPLICATION

This application claims priority to European Patent Application No. 18203985.9 filed on Nov. 1, 2018, the entire disclosure of which is hereby incorporated herein by reference.

FIELD OF THE INVENTION

The invention concerns a one-piece bar for attaching a bracelet or strap to a watch.

The invention also concerns a wristwatch including at least one such one-piece bar.

STATE OF THE ART

In the field of wristwatches, it is known to attach the bracelet to the watch by means of at least one spring bar. The spring bar is, for example, provided at the ends thereof with two pivots, one of which is retractable to allow the bracelet to be removed from the watch. The spring bar is inserted into a loop of the bracelet, and each pivot is intended to be introduced into a corresponding housing of a respective horn of the watch case, in order to attach the bracelet to the watch. Such a bar is, for example, disclosed in Swiss Patent document CH327838A. The bar has a hollow body; two pivots arranged inside the hollow body; a spring disposed inside the hollow body, supported between the pivots; and a lug. The two pivots are able to slide into a respective end of the hollow body. The spring pushes back the pivots so that each of their outer ends enters corresponding housings in the watch case horns. The lug is actuatable by a specific tool, which a user introduces into one end of the bracelet to move the lug against the action of the spring and to remove the pivot from the corresponding housing of the watch case horn.

However, such a spring bar is relatively complex to produce due to the number of different elements comprised therein, these elements being assembled and mounted one after the other. This is expensive when several bars are made at the same time, in terms of manufacturing and mounting the elements. Further, with a spring bar of this type, a user cannot easily retract both pivots in a single movement, or without a tool.

In order to overcome this drawback, there are also known, in various fields of application, such as, for example, the field of horology, resilient snap-fit members made from a single piece of material. A one-piece snap-fit member of this type is, for example, described in European Patent document No EP1351106A1. The snap fit member makes it possible to hold a first element with respect to a second element, and, for example, forms a one-piece bar for attaching a bracelet to a watch. The one-piece bar has two ends connected by a shaft capable of elastic deformation in its axial direction. The longitudinal elasticity of the shaft is conferred by the fact that it has several apertures along its length. The apertures lie alternately on either side of a median plane of the shaft.

However, one drawback of such a one-piece bar is that it is complex and expensive to make.

SUMMARY OF THE INVENTION

It is thus an object of the invention to provide a one-piece bar for attaching a bracelet to a watch, which has a simplified design and a reduced manufacturing cost, while providing a more aesthetic and robust one-piece solution.

To this end, the invention concerns a one-piece bar for attaching a bracelet to a watch.

Specific embodiments of the bar are defined in the dependent claims 2 to 6.

One advantage of the bar of the invention lies in the fact that the body of the bar comprises a plurality of elements connected to one another. Each element has a hollowed portion, to give the bar longitudinal elasticity and allow elastic deformation thereof in its longitudinal direction.

According to a particular technical feature of the invention, each element has a peripheral frame surrounding the hollowed portion, with the peripheral frames of the elements being connected to one another.

Advantageously, the peripheral frame of each element has substantially the shape of a closed 'M', the peripheral frames of the elements being connected to one another via longitudinal connecting members, with each longitudinal connecting member connecting a portion of frame that closes the CM' of one element to a portion of frame that forms the central acute angle of the CM' of another element. This offers a good compromise between flexibility, elasticity and breaking strength for the bar. Further, such a bar has a longer life, since the work of the material occurs with little or no aging.

Advantageously, the body includes a first set of elements whose peripheral frame has substantially the shape of a closed 'M', and a second set of elements whose peripheral frame has substantially the shape of a closed 'M', the number of elements of the first set being equal to the number of elements of the second set, the elements of the first set being oriented in a same first direction along the longitudinal direction in which the bar extends, the elements of the second set being arranged symmetrically to the elements of the first set with respect to a median plane perpendicular to the longitudinal direction, and being oriented in a second direction, opposite to the first direction, along the longitudinal direction. Such a configuration allows the bar to undergo uniformly distributed compression forces when the user performs the bar retraction operation. This thus reduces the risk of mechanical breakage of the bar.

To this end, the invention also concerns a wristwatch comprising at least one one-piece attachment bar described above, which includes the features mentioned in the dependent claim 7.

BRIEF DESCRIPTION OF THE DRAWINGS

The objects, advantages and features of the one-piece bar for attaching a bracelet to a watch, and the wristwatch comprising the same will appear more clearly in the following description based on at least one non-limiting embodiment, illustrated by the drawings, in which:

FIG. 1 is a perspective view of a one-piece bar for attaching a bracelet to a watch according to an exemplary embodiment of the invention.

DETAILED DESCRIPTION OF THE INVENTION

FIG. 1 represents a one-piece bar 1 for attaching a bracelet to a watch according to an exemplary embodiment of the invention. The bracelet and the watch are not represented in the FIGURES for reasons of clarity. The bracelet is made, for example, of leather, metal, a ceramic material or another different material, although this is not limiting in the context of the invention.

The one-piece bar 1 comprises two pivots 2 and a body 4 connecting the two pivots 2. One-piece bar 1 is intended to be inserted into a loop of the bracelet, each of pivots 2 being introduced into a corresponding housing of a respective horn of the watch case, in order to attach the bracelet to the watch. One-piece bar 1 extends in a longitudinal direction D1. One-piece bar 1 is, for example, made of a plastic material, or of rubber, although this is not limiting in the context of the present invention.

Body 4 includes several elements 6 connected to one another. In the illustrative example of FIG. 1, body 4 has eight elements 6. Each of elements 6 has a hollowed portion 8. The presence of these hollowed portions 8 in elements 6 of body 4 gives bar 1 longitudinal elasticity, to allow elastic deformation thereof in longitudinal direction D1. Preferably, as illustrated in FIG. 1, hollowed portion 8 of each element 6 is a substantially central portion of element 6. Also preferably, hollowed portion 8 of each element 6 is hollowed in a direction D2 perpendicular to longitudinal direction D1 in which bar 1 extends. Also preferably, each element 6 has a peripheral frame 10 surrounding hollowed portion 8. The peripheral frames 10 of the various elements 6 are connected to one another. The peripheral frames 10 of the end elements 6 are connected to the two pivots 2.

According to a particular embodiment represented in FIG. 1, the peripheral frame 10 of each element 6 has substantially the shape of a closed 'M'. The peripheral elements 10 of elements 6 are connected to each other via longitudinal connecting members 12. Each longitudinal connecting member 12 connecting two peripheral frames 10 connects, in particular, a portion of frame 14 that closes the 'M' of one element 6 to another portion of frame 16 that forms the central acute angle of the 'M' of another element 6. Body 4 also comprises two end longitudinal members 18. Each end longitudinal connecting member 18 connects a peripheral frame 10 of one end element 6 to one of pivots 2. More specifically, in the particular embodiment represented in FIG. 1, each end longitudinal connecting member 18 connects a portion of frame 16 forming the central acute angle of the 'M' of one end element 6 to one of pivots 2.

According to the particular embodiment represented in FIG. 1, body 4 comprises a first set 20 of elements 6 whose peripheral frame 10 has substantially the shape of a closed 'M', and a second set 22 of elements 6 whose peripheral frame 10 has substantially the shape of a closed 'M'. The number of elements 6 of first set 20 is equal to the number of elements 6 of second set 22. In the illustrative example of FIG. 1, the number of elements 6 of first set 20 and the number of elements 6 of second set 22 is equal to four. The elements 6 of first set 20 are oriented in a same first direction along longitudinal direction D1. The elements 6 of second set 22 are arranged symmetrically to elements 6 of first set 20 with respect to a median plane P1 perpendicular to longitudinal direction D1. The elements 6 of second set 22 are oriented in a second direction, opposite to the first direction, along longitudinal direction D1.

The operation of one-piece bar 1 according to the invention will now be described.

FIG. 1 represents bar 1 in a rest position, with each of pivots 2 inserted into a corresponding housing of a respective horn of the watch case. When a watch user applies pressure on pivots 2 towards the centre of bar 1, bar 1 retracts in longitudinal direction D1. This deformation of bar 1 is facilitated by the presence of hollowed elements 6. This releases bar 1 from its position between the watch case horns, thereby releasing the watch from the bracelet. When the watch user releases the pressure on pivots 2, bar 1 reverts to its initial shape, due to the elastic stress applied by hollowed elements 6. Bar 1 is thus once again in the rest position.

The invention claimed is:

1. A one-piece bar for attaching a bracelet to a watch, the bar extending in a longitudinal direction and comprising:
    two pivots and a body connecting the two pivots, each pivot being configured to be introduced into a corresponding housing of a respective horn of a watch case, the body comprising a plurality of elements connected to one another, each element having a hollowed portion, in order to give the bar longitudinal elasticity to allow elastic deformation thereof in the longitudinal direction,
    wherein each element comprises a peripheral frame having substantially the shape of a closed 'M' such that the peripheral frame surrounds the hollowed portion to have an 'H' shape with first and second legs extending in a direction perpendicular to the longitudinal direction and a third leg extending in the longitudinal direction to connect the first and second legs.

2. The one-piece bar according to claim 1, wherein the hollowed portion of each element is a substantially central portion of the element.

3. The one-piece bar according to claim 1, wherein the peripheral frames of the elements are connected to one another.

4. The one-piece bar according to claim 3, wherein the peripheral frames of the elements are connected to one another via longitudinal connecting members, each longitudinal connecting member connecting a portion of frame that closes the 'M' of one element to a portion of frame that forms the central acute angle of the 'M' of another element.

5. The one-piece bar according to claim 4, wherein the body has a first set of elements whose peripheral frame has substantially the shape of a closed 'M', and a second set of elements whose peripheral frame has substantially the shape of a closed 'M', the number of elements of the first set being equal to the number of elements of the second set, the elements of the first set being oriented in a same first direction along the longitudinal direction in which the bar extends, the elements of the second set being arranged symmetrically to the elements of the first set with respect to a median plane perpendicular to the longitudinal direction, and being oriented in a second direction, opposite to the first direction, along the longitudinal direction.

6. A wristwatch comprising at least one of the one-piece bar according to claim 1 for attaching the bracelet to the watch.

7. The one-piece bar according to claim 1, wherein the body includes longitudinal end members that are each connected to one of the elements and extend through one of the pivots to protrude out of the pivot in the longitudinal direction.

* * * * *

UNITED STATES PATENT AND TRADEMARK OFFICE
CERTIFICATE OF CORRECTION

| | |
|---|---|
| PATENT NO. | : 10,918,173 B2 |
| APPLICATION NO. | : 16/659636 |
| DATED | : February 16, 2021 |
| INVENTOR(S) | : Vuille et al. |

It is certified that error appears in the above-identified patent and that said Letters Patent is hereby corrected as shown below:

On the Title Page

Column 1, Item (73), in "Assignee", Line 2, delete "Mann" and insert -- Marin --, therefor.

Signed and Sealed this
Seventh Day of May, 2024

Katherine Kelly Vidal
*Director of the United States Patent and Trademark Office*